United States Patent
Stickel

(10) Patent No.: US 9,431,890 B2
(45) Date of Patent: Aug. 30, 2016

(54) APPARATUSES AND METHODS FOR CONVERTING SINGLE INPUT VOLTAGE REGULATORS TO DUAL INPUT VOLTAGE REGULATORS

(71) Applicant: MICRON TECHNOLOGY, INC., Boise, ID (US)

(72) Inventor: Shaun A. Stickel, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 672 days.

(21) Appl. No.: 13/771,787

(22) Filed: Feb. 20, 2013

(65) Prior Publication Data

US 2014/0232195 A1    Aug. 21, 2014

(51) Int. Cl.
G05F 3/06    (2006.01)
*H02M 1/14*    (2006.01)
H02M 1/00    (2006.01)

(52) U.S. Cl.
CPC .......... *H02M 1/14* (2013.01); *H02M 2001/008* (2013.01); *Y10T 307/696* (2015.04)

(58) Field of Classification Search
CPC ..... H02M 1/32; H02M 3/1584; H02M 7/493; H02M 2001/0077; H02M 2001/008; H02M 3/158; H02M 5/4585; H02M 7/48; H02M 7/49; H02M 2007/4835; H02M 3/156; H02M 5/458; H02M 7/44; H02M 7/05
USPC ....................................................... 307/151
See application file for complete search history.

(56) References Cited

U.S. PATENT DOCUMENTS

| | | | |
|---|---|---|---|
| 5,530,636 A | 6/1996 | Brown | |
| 6,809,678 B2 | 10/2004 | Vera et al. | |
| 8,228,047 B2 | 7/2012 | Li et al. | |
| 8,253,399 B2 * | 8/2012 | Peterson | H02M 3/1588 323/271 |
| 2006/0066288 A1 * | 3/2006 | Wheeler | H02M 3/1588 323/282 |
| 2007/0262755 A1 * | 11/2007 | Hung | H02M 3/1584 323/222 |
| 2010/0097045 A1 | 4/2010 | Chen | |
| 2011/0156669 A1 * | 6/2011 | Ishii | H02M 3/1588 323/271 |
| 2012/0256671 A1 * | 10/2012 | Xu | H02M 3/1588 327/175 |
| 2012/0326680 A1 * | 12/2012 | Burns | H02M 3/1588 323/224 |
| 2013/0021008 A1 * | 1/2013 | Hume | H02M 3/1588 323/271 |
| 2013/0169255 A1 * | 7/2013 | Daigle | G05F 1/56 323/284 |

* cited by examiner

*Primary Examiner* — Jared Fureman
*Assistant Examiner* — Esayas Yeshaw
(74) *Attorney, Agent, or Firm* — Dorsey & Whitney LLP

(57) ABSTRACT

Apparatuses and methods for providing output power are disclosed. In an example method, a control signal is received at an output stage. The control signal may be provided by a control circuit. The method further includes providing a first power to a filter responsive to the received control signal having a first value, and providing a second power to the filter responsive to the received control signal having a second value. The method further includes decoupling the first power and second power from the filter responsive to the received control signal having a third value.

24 Claims, 7 Drawing Sheets

APPARATUSES AND METHODS FOR CONVERTING SINGLE INPUT VOLTAGE REGULATORS TO DUAL INPUT VOLTAGE REGULATORS

TECHNICAL FIELD

Embodiments of the present invention relate generally to electronic device power regulators and more specifically, in one or more of the illustrated embodiments, to buck voltage regulators.

DESCRIPTION OF RELATED ART

Advances in technology have resulted in smaller and more powerful computing devices. Computing devices often require regulation of received power buses in order to provide output power having a voltage level or voltage levels to indicate multiple voltage levels on the target devices. Each power bus received at the computing device supports a maximum power load. Conventional power regulators are usually designed to provide regulated output power from a single power bus even where more than one power bus is available. Often, the power source having the largest voltage is selected to provide the regulated output power for each electronic device, which places a disproportionate load on a single power source. Further, regulated output power from a single power source creates a single point of power failure for the computing device.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
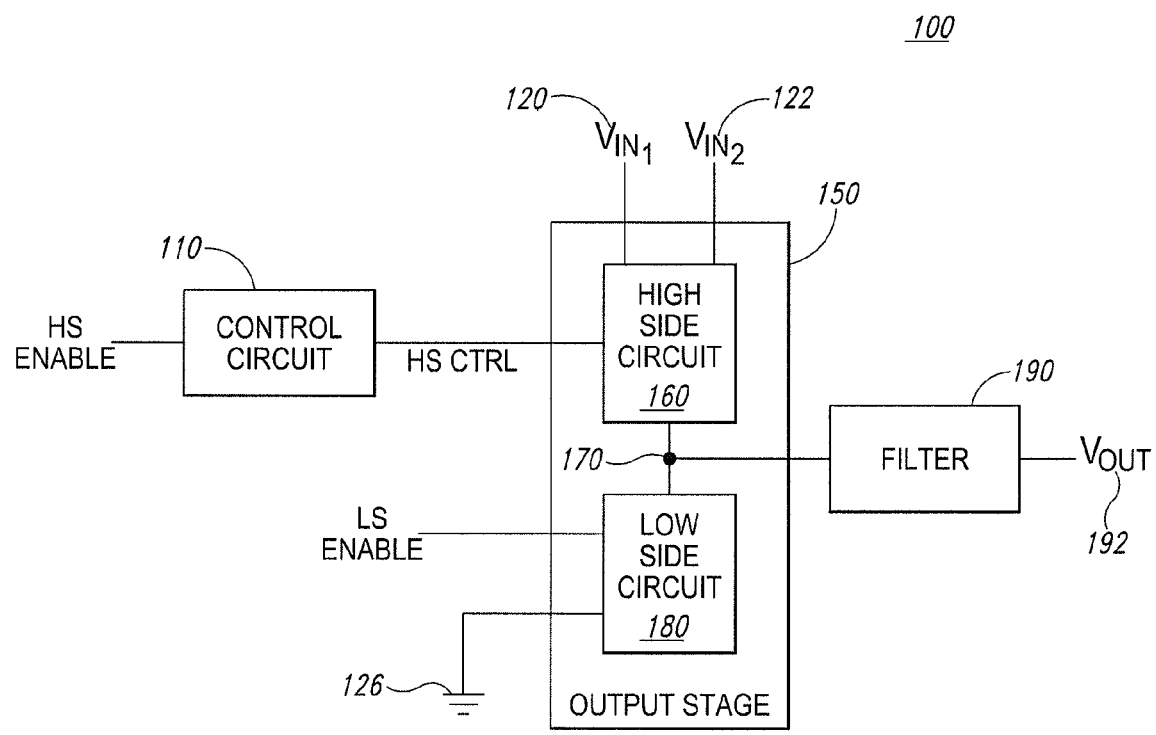
FIG. 1 is a block diagram of a first particular illustrative embodiment of an apparatus including a voltage regulator circuit.

Referring to FIG. 1, a particular illustrative embodiment of an apparatus (e.g., an integrated circuit, a memory device, a memory system, an electronic device or system, a smart phone, a tablet, a computer, a server, etc.) including a voltage regulator circuit is disclosed and generally designated 100. The system 100 may allow provision of output power based on multiple input power sources. The system 100 may include a control circuit 110 coupled to a high-side circuit 160 of an output stage 150. The high-side circuit 160 and a low-side circuit 180 of the output stage 150 are coupled to a filter 190 via a filter input node 170.

The control circuit 110 may receive a high side enable signal HS ENABLE and provide a high side control signal HS CTRL to the high-side circuit 160 of the output stage 150. A value of the HS CTRL signal may be based on a value of the high side enable. For example, the control circuit 110 provides a HS CTRL signal having a first value or a second value to the high-side circuit 160 while the HS ENABLE signal is active. Further, the control circuit 110 may provide a HS CTRL signal having a third value while the HS ENABLE signal is inactive. The HS ENABLE signal may be provided to the control circuit 110 by a voltage controller (not shown) as described further with reference to FIG. 3.

The high-side circuit 160 may be coupled to two or more power sources (not shown) providing respective input power VIN1 and VIN2. For example, in the particular embodiment illustrated in FIG. 1, a first power source may be coupled to a first power input 120 and a second power source may be coupled to a second power input 122. The high-side circuit 160 may provide an output based on the input power provided by one or more power sources to the filter 190 via the filter input node 170. In an embodiment, the high-side circuit 160 selectively provides power from the first power input 120, the second power input 122, or a combination of the first and second power inputs 120, 122 to the filter 190 based on the HS CTRL signal. In a particular embodiment, the high-side circuit 160 decouples power provided to both the first power input 120 and the second power input 122 from the filter 190 based on the HS CTRL signal.

The low-side circuit 180 may be coupled to a reference node providing a reference voltage. For example, the low-side circuit 180 may be coupled to ground at a reference input 126. An input of the low-side circuit 180 may be coupled to an output of a voltage controller (not shown). In an embodiment, an input of the low-side circuit 180 receives the low side enable signal LS ENABLE from the voltage controller. The low-side circuit 180 may provide an output to the filter 190 via the filter input node 170. In an embodiment, the low-side circuit 180 selectively provides the reference voltage to the filter 190 based on the low side enable. In a particular embodiment, the low-side circuit 180 decouples the reference voltage from the filter input node 170 based on the LS ENABLE signal.

The filter 190 provides an output VOUT at a power output 192. In an embodiment, the filter 190 is a low-pass filter. The output of the filter 190 may provide power for use by, for example, devices, circuits, and/or other apparatuses using electrical power (not shown).

During operation, the voltage controller may provide an active HS ENABLE signal to the control circuit 110 during a first time period and may provide an active LS ENABLE signal to the low-side circuit 180 during a second time period. In an embodiment, the first time period and the second time period are non-overlapping time periods. The HS ENABLE signal may be complementary to the LS ENABLE signal. For example, the HS ENABLE signal being active may correspond to the LS ENABLE signal being inactive. Further, the HS ENABLE signal being inactive may correspond to the LS ENABLE signal being active. In an embodiment, a duration of the first time period and a duration of the second time period are configurable and complementary in relation to an overall voltage controller time period.

In an embodiment, the control circuit 110 may provide the HS CTRL signal to the high-side circuit 160. For example, during a first portion of the first time period, the control circuit 110 provides the HS CTRL signal to the high-side circuit 160 having a first value. Further, during a second portion of the first time period, the control circuit 110 may provide the HS CTRL signal having a second value. In a particular embodiment, the second value is distinct from the first value. In a particular embodiment, the first portion of the first time period and the second portion of the first time period are configurable, non-overlapping time periods.

The high-side circuit 160 may provide power from a selected power input to the filter 190 via the filter input node 170 responsive to the HS CTRL signal. In an embodiment, the high-side circuit 160 provides power from a first power source coupled to the first power input 120 to the filter 190 while the HS CTRL signal is a first value, and the high-side circuit 160 provides power from a second power source coupled to the second power input 122 to the filter 190 while the HS CTRL signal is a second value. In another embodiment, the high-side circuit 160 decouples both power from the first power input 120 and the second power input 122 from the filter input node 170 while the high side control signal 114 is a third value.

The low-side circuit 180 may selectively provide the reference to the filter 190 via the filter input node 170 based on the LS ENABLE signal. For example, the low-side circuit 180 provides the reference to the filter 190 while the LS ENABLE signal is active. Further, the low-side circuit 180 may decouple the reference node from the filter input node 170 while the LS ENABLE signal is inactive.

As previously discussed, the filter 190 may be a low pass filter that provides power to the power output 192. The output may be an average of values received from the filter input node 170 over time. For example, the filter 190 may average the power provided to the first power input 120 during a first portion of the first time period, the power provided to the second power input 122 during a second portion of the first time period, and the reference that is received during the second time period, over a total time period that includes the first time period and the second time period.

As would be evident to those skilled in the art, the control circuit 110 may provide the HS CTRL signal to the high-side circuit 160 representing more than three states. Further, the high-side circuit 160 may be coupled to and select from more than two power sources based on the HS CTRL signal.

The use of the control circuit 110 with the high-side circuit 160 may allow use of more than one available power source to generate a device power supply in a way that may distribute the power supply load among the power sources and may reduce a load placed on any single power supply. Further, generating a device power supply from multiple power sources may increase redundancy and robustness of the generated device power supply. In addition, the control circuit 110 allows generation of two output signals from a single-input, single-output buck regulator voltage controller.

Figure 2:
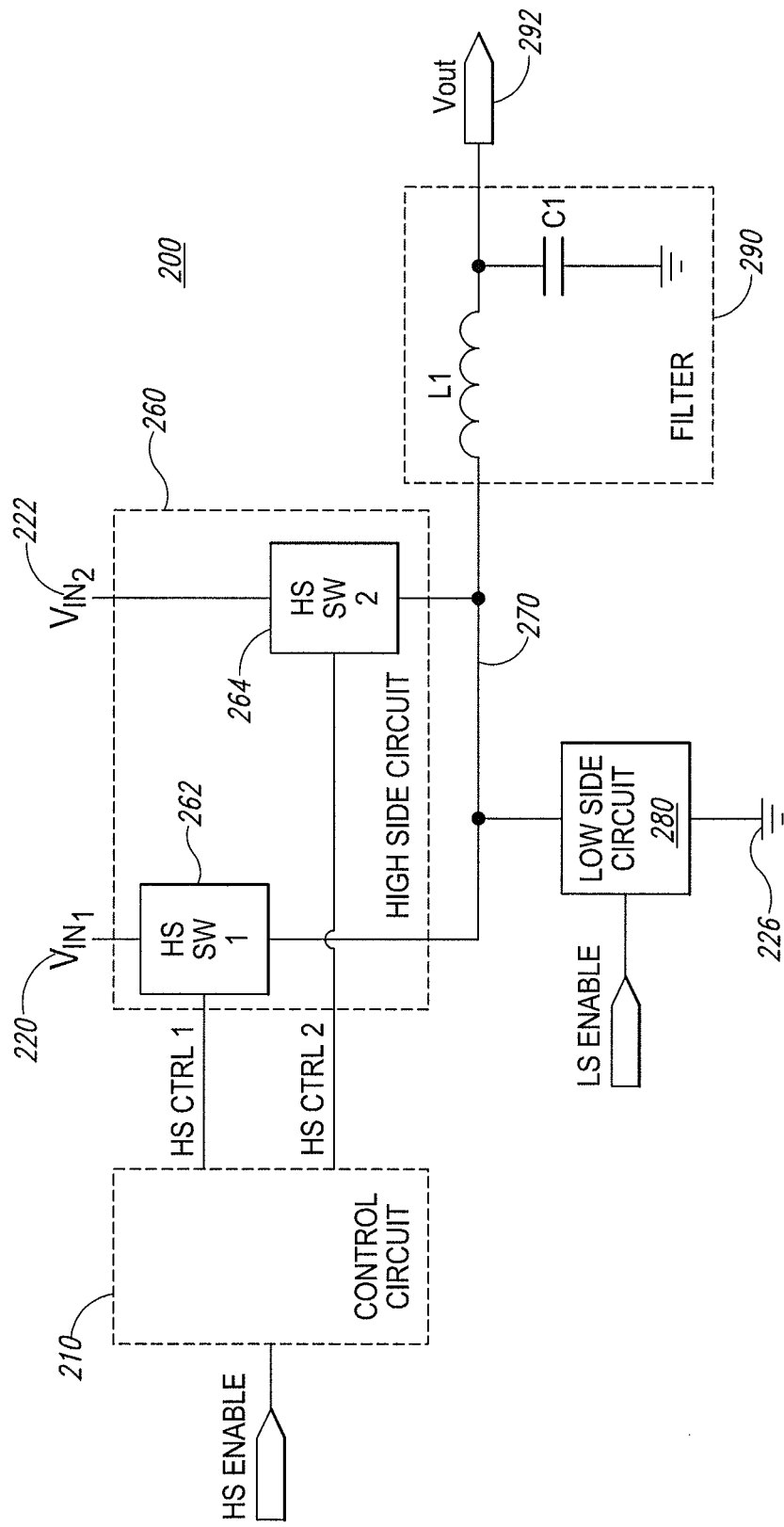
FIG. 2 is a block diagram of a second particular illustrative embodiment of a apparatus including a voltage regulator circuit.

Referring to FIG. 2, a particular illustrative embodiment of an apparatus including a voltage regulator circuit is disclosed and generally designated 200. The system 200 may include a control circuit 210 coupled to a high-side circuit 260. The system 200 may further include a low-side circuit 280. The high-side circuit 260 and the low-side circuit 280 may each be coupled to a filter 290 via a filter input node 270. The control circuit 210 may include the control circuit 110 of FIG. 1, the high-side circuit 260 may include the high-side circuit 160 of FIG. 1, low-side circuit 280 may include the low-side circuit 180 of FIG. 1, and the filter 290 may include the filter 190 of FIG. 1. The system 200 may allow provision of regulated output power based on multiple input power sources.

The control circuit 210 may receive an enable signal HS ENABLE from a voltage controller (not shown). The control circuit 210 may provide a first high side control signal HS CTRL1 and a second high side control signal HS CTRL2 to the high-side circuit 260 based on the received HS ENABLE. In a particular embodiment, the control circuit 210 provides the HS CTRL1 signal to a first high side switching circuit 262 and provides the HS CTRL2 signal to a second high side switching circuit 264.

Each switching circuit 262, 264 may be coupled to a respective power source. For example, a power input 220 of the first high side switching circuit 262 is coupled to a first power source (not shown) and a power input 222 of the second high side switching circuit 264 is coupled to a second power source (not shown). Each switching circuit may receive a respective HS CTRL signal from the control circuit 210. For example, the first high side switching circuit 262 receives the HS CTRL1 signal and the second high side switching circuit 264 receives the HS CTRL2 signal. Each switching circuit, may selectively provide an output to the filter 290 via the filter input node 270 based on a respective HS CTRL signal.

The low-side circuit 280 may be coupled to a reference node that provides a reference voltage. For example, the low-side circuit 280 may be coupled to ground at a reference input 226. An input of the low-side circuit 280 may be coupled to an output of a voltage controller (not shown). In an embodiment, an input 216 of the low-side circuit 280 receives the low side enable signal LS ENABLE from the voltage controller. The low-side circuit 280 may selectively provide the reference voltage to the filter 290 based on the LS ENABLE signal. In a particular embodiment, the low-side circuit 280 decouples the reference voltage from the filter input node 270 based on the LS ENABLE signal.

The filter 290 provides an output at a power output 292. In an embodiment, the filter 290 is a low-pass filter. The output of the filter 290 may provide power for use by, for example, devices, circuits, and/or other apparatuses using electrical power (not shown).

During operation, the control circuit 210 may selectively provide an active HS CTRL1 signal to the first high side switching circuit 262 and may selectively provide an active HS CTRL2 signal to the second high side switching circuit 264 during respective portions of a first time period. For example, during a first portion of the first time period, the control circuit 210 activates the HS CTRL1 signal provided to the first high side switching circuit 262 and deactivates the HS CTRL2 signal provided to the second high side switching circuit 264. Further, during a second portion of the first time period, the control circuit 210 may deactivate the HS CTRL1 signal provided to the first high side switching circuit 262 and may activate the HS CTRL2 signal provided to the second high side switching circuit 264. In an embodiment, the first portion of the first time period and the second portion of the first time period are configurable and non-overlapping time periods. During a second time period, the HS CTRL1 signal and the HS CTRL2 signal may both be inactive.

The high-side circuit 260 may provide power from a selected power source to the filter 290 via the filter input node 270 responsive to a value of the HS CTRL1 signal received from the control circuit 210. While the HS CTRL1 signal is active (e.g., during the first portion of the first time period), the first high side switching circuit 262 may provide power from the first power source coupled to the first power input 220 to the filter 290. Further, while the HS CTRL1 signal is inactive, the first high side switching circuit 262 may decouple the first power source from the filter input node 270. While the HS CTRL2 signal is active (e.g. during the second portion of the first time period), the second high side switching circuit 264 may provide power from the second power source coupled to the second power input 222 to the filter 290. Further, while the HS CTRL2 signal is inactive, the second high side switching circuit 264 may decouple the second power source from the filter input node 270. The HS CTRL1 signal may be complementary to the HS CTRL2 signal during the first time period. For example, during the first time period, an active state of the HS CTRL1 signal may correspond to an inactive state of the HS CTRL2 signal. Further, an inactive state of the HS CTRL1 signal may correspond to an active state of the HS CTRL2 signal.

The low-side circuit 280 may decouple the reference input 226 from the filter input node 270 based on the LS ENABLE signal being inactive (e.g., during the first time period). The low-side circuit 280 may couple the reference input 226 to the filter input node 270 based on the LS ENABLE signal being active (e.g. during the second time period).

As explained above, the filter 290 may receive inputs from each of the high side circuit 260 and the low side circuit 280 over a voltage controller period, and provide an output VOUT at the power output 292 that represents an average of the received power inputs over a time period spanning the first time period and the second time period. The filter 290 may provide the VOUT output as a power supply to one or more devices. The first switching circuit 262 and/or the second switching circuit 264 of the high-side circuit 260 include a switching component that includes a n-type field effect transistor (nFET), a p-type field effect transistor (pFET), a bipolar junction transistor (BJT), an insulated-gate bipolar transistor (IGBT), or other suitable switching logic component or components.

As would be evident to those skilled in the art, the control circuit 210 may provide more than two HS CTRL signals to the high-side circuit 260. Further, the high-side circuit 260 may include more than two high side switching circuits that are each configured to receive power from respective power sources.

The control circuit 210 with the high-side circuit 260 supports generating a power supply from more than one power source, which may result in increased efficiency and balanced loading among more than one power source.

Figure 3:
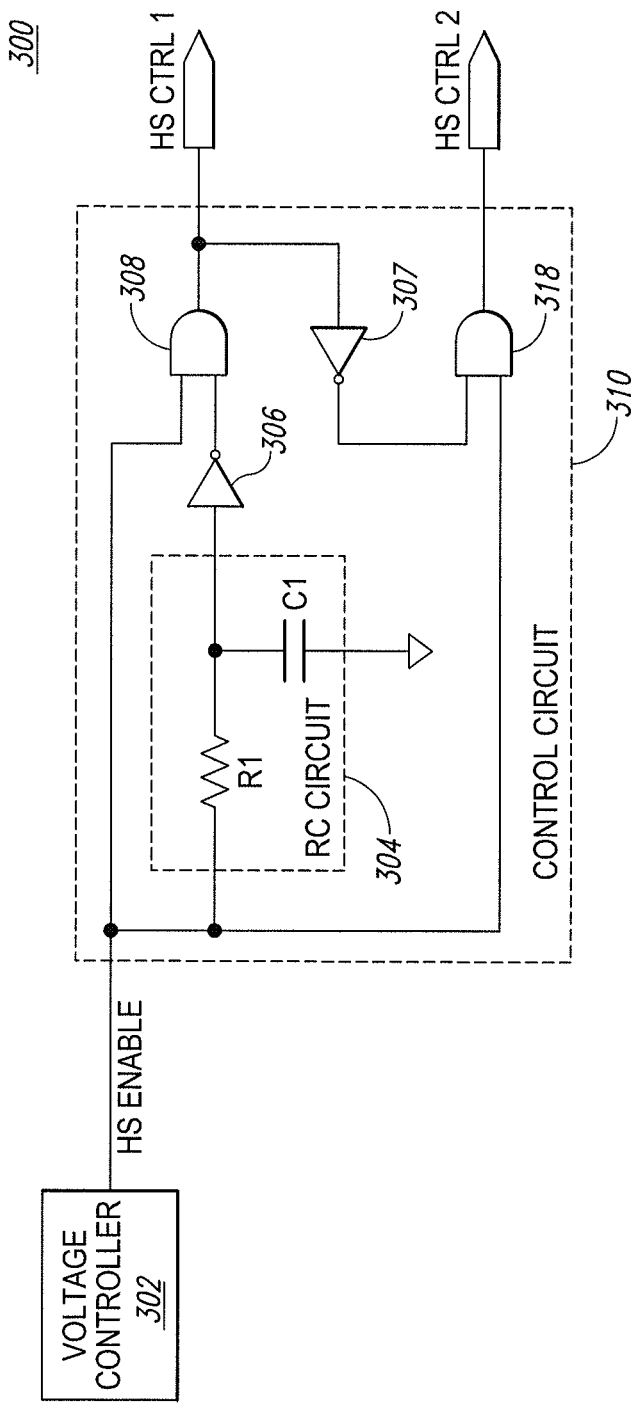
FIG. 3 is a diagram of a particular illustrative embodiment of a system including a control circuit

Referring to FIG. 3, a particular illustrative embodiment of a control circuit is disclosed and generally designated 300. The 300 may include a voltage controller 302 coupled to a control circuit 310. The control circuit 310 may be the control circuit 110 of FIG. 1 or the control circuit 210 of FIG. 2, or any combination thereof.

The voltage controller 302 may provide an output to the control circuit 310. In an embodiment, the voltage controller 302 may provide a high side enable signal HS ENABLE to the control circuit 310. The voltage controller 302 may be a buck regulator voltage controller designed to support a single input, single output buck regulator.

The control circuit 310 may be coupled to the voltage controller 302 to receive the HS ENABLE signal. The control circuit 318 may include a first AND gate 308 and a second AND gate 318. The control circuit 310 may provide two outputs (e.g., via the first AND gate 308 and the second AND gate 318).

The first AND gate 308 may receive two inputs. In a particular embodiment, the first AND gate 308 receives the HS ENABLE signal at a first input and an inverted output of a resistor-capacitor (RC) circuit 304 at a second input. The first AND gate 308 may provide an output based on the received first input and the received second input. In a particular embodiment, the first AND gate 308 may provide a first high side control signal HS CTRL1. An inverted output of the first AND gate 308 may be provided to the second AND gate 318.

The RC circuit 304 may receive the HS ENABLE signal at an input and provide an output to the second input of the first AND gate 308 via a first inverter 306. The RC circuit 304 may be an RC circuit having a resistor R1 in series with the second input of the first AND gate 308, and having a capacitor C1 coupled to the second input of the first AND gate 308. The first inverter 306 may be serially coupled between the output of the RC circuit 304 and the second input of the first AND gate 308.

The second AND gate 318 may receive two inputs. In an embodiment, the second AND gate 318 may receive the HS ENABLE signal at a first input and an inverted output of the first AND gate 308 at a second input. The output of the first AND gate 308 is inverted prior to input to the second AND gate 318 via a second inverter 307. The second AND gate 318 may provide the second high side control signal HS CTRL2 based on the received first input and the received second input.

During operation, the voltage controller 302 provides an active HS ENABLE signal state during a first time period. The control circuit 310 receives the HS ENABLE signal at the first input of the first AND gate 308, the first input of the second AND gate 318, and an input of the RC circuit 304. During a first portion of the first time period, the active HS ENABLE signal and the inverted output of the RC circuit 304 (via the first inverter 306) representing an active value may drive the output of the first AND gate 308 (e.g., the first high side control signal) to an active state. The active HS CTRL1 signal is routed through the second inverter 307 and into the second input of the AND gate 308, and as a result, the second AND gate 318 provides an active HS CTRL2 signal representing an inactive state.

During the transition from the first portion of first time period to a second portion of the first time period, the RC circuit 304 may change from an initial inactive state to an active state based on the HS ENABLE signal. As the RC circuit 304 transitions to the active state, the output of the RC circuit (inverted into the second input of the first AND gate 308) results in the first AND gate 308 (e.g., the first high side control signal) providing an output having an inactive state. Accordingly, the output of the first AND gate 308 representing an active state may drive (via the second inverter 307) the output of the second AND gate 318 to an active state.

During the second time period, the voltage controller may drive the HS ENABLE signal to an inactive state to the first input of each of the first AND gate 308 and the second AND gate 318, causing the first AND gate 308 and the second AND gate to each provide an output having an inactive state.

The duration of the first portion of the first time period may be dependant on the rise time associated with the RC circuit 304. Accordingly, the duration of the first portion of the first time period may be configured based on the design of the RC circuit 304. For example, a time constant associated with the RC circuit 304 can be altered by varying the resistive element R1 and/or capacitive element C1.

In other particular embodiments, the logic circuit described in the control circuit 310 may be implemented using many distinct logical configurations having more, less, and/or different logic components to achieve an equivalent logical output. For example, each AND gate could be replaced by two NAND gates coupled in series. As would be evident to those skilled in the art, the control circuit 310 may provide more than two high side control signals.

The control circuit 310 may allow generation of a power supply from more than one power source using the voltage controller 302 that may be intended to support generating a power supply from a single power source. The system 300 may provide a power supply having increased flexibility and robustness in comparison to a single power source regulator. One of ordinary skill in the art would appreciate that the system 300 represents one example of a control circuit and that the control circuit 310 may be implemented using other logic circuits. Further, one of skill in the art would also appreciate that the control circuit 310 may be implemented using a field-programmable gate array (FPGA) device, an application-specific integrated circuit (ASIC), a processing unit such as a central processing unit (CPU), a digital signal processor (DSP), a controller, another hardware device, a firmware device, or any combination thereof.

Figure 4:
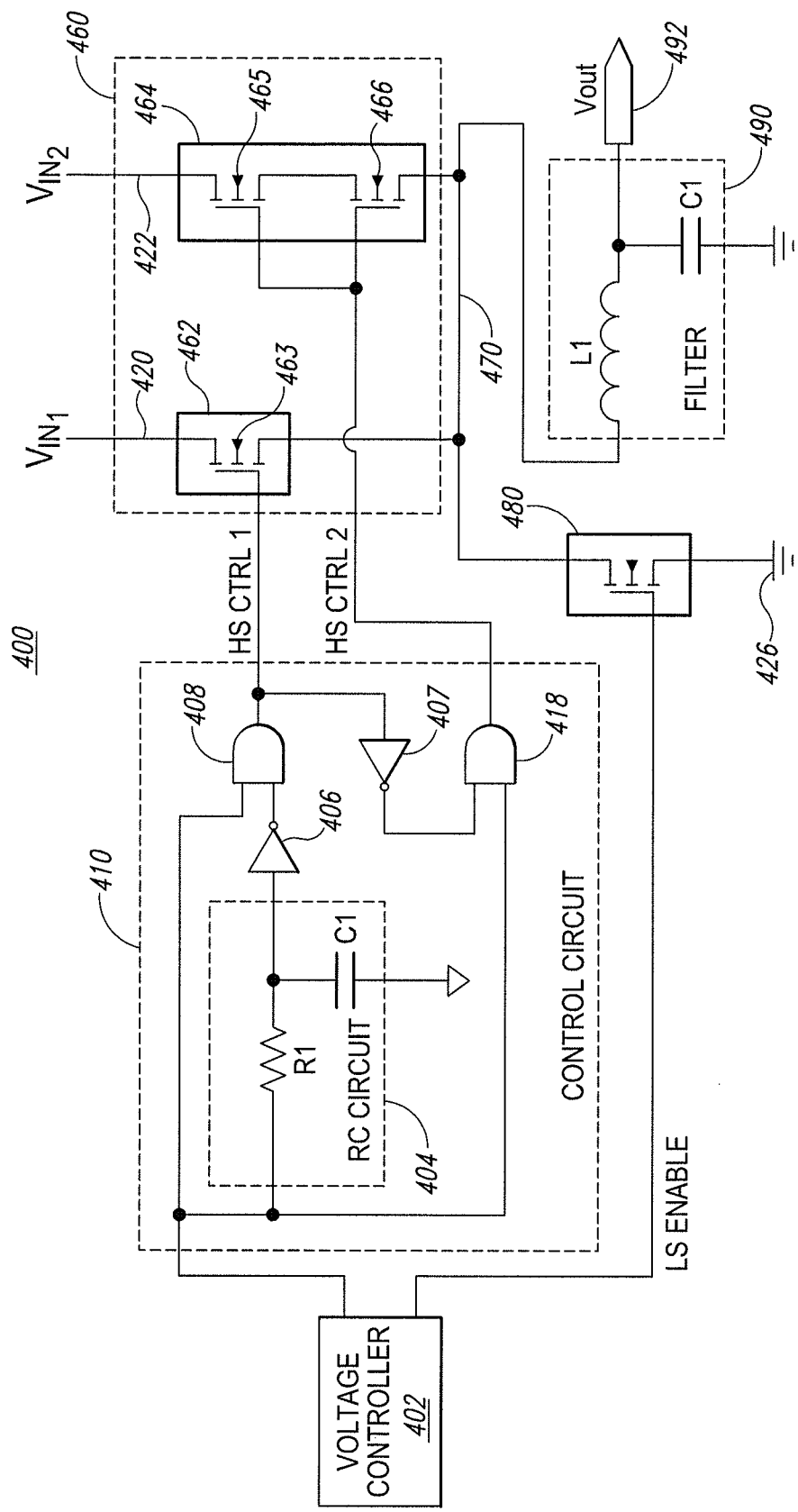
FIG. 4 is a diagram of a particular illustrative embodiment of an apparatus including a voltage regulator circuit

Referring to FIG. 4, a particular illustrative embodiment of an apparatus including a voltage regulator circuit is disclosed and generally designated 400. The system 400 may include a voltage controller 402 coupled to a control circuit 410 and a low-side circuit 480. The control circuit 410 is coupled to a high-side circuit 460. The high-side circuit 460 and the low-side circuit 480 may each be coupled to a filter 490 via a filter input node 470. The control circuit 410 may include the control circuit 110 of FIG. 1, the control circuit 210 of FIG. 2, the control circuit 310 of FIG. 3, or any combination thereof. The high-side circuit 460 may include the high-side circuit 160 of FIG. 1, the high-side circuit 260 of FIG. 2, or any combination thereof. The low-side circuit 480 may include the low-side circuit 180 of FIG. 1, the low-side circuit 280 of FIG. 2, or any combination thereof. The filter 490 may include the filter 190 of FIG. 1, the filter 290 of FIG. 2, or any combination thereof. The system 400 may allow provision of regulated output power based on multiple input power sources.

The voltage controller 402 may provide an active high side enable signal HS ENABLE to the control circuit 410 during a first time period and an active low side enable signal LS ENABLE to the low-side circuit 480 during a second time period. The HS ENABLE signal may be provided to a first AND gate 408, a second AND gate 418 and a RC circuit 404. The control circuit 410 may provide a first high side control signal HS CTRL1 at an output of the first AND gate 408 and a second high side control signal HS CTRL2 at an output of the second AND gate 418. The HS CTRL1 signal output from the first AND gate 408 may be based on the HS ENABLE signal and an inverted output (e.g., via inverter 406) of the RC circuit 404. The HS CTRL2 signal output from the second AND gate 418 may be based on the HS ENABLE signal and an inverted output (e.g., via inverter 407) of the first AND gate 408.

The high-side circuit 460 may include a first high side switching circuit 462 and a second high side switching circuit 464. Each switching circuit may be coupled to a respective power source (not shown). For example, a power input 420 of the first high side switching circuit 462 may be coupled to a first power source and a power input 422 of the second high side switching circuit 464 may be coupled to a second power source. Each switching circuit may receive a respective HS CTRL signal from the control circuit 410. For example, the first high side switching circuit 462 receives the HS CTRL1 signal and the second high side switching circuit 464 receives the HS CTRL2 signal. Each switching circuit, may provide an output to the filter 290 via the filter input node 270 based on a respective HS CTRL signal.

The first high side switching circuit 462 may include a first switching element 463. The first switching element 463 may be configured to couple the first power input 420 to a filter input node 470. The first switching element 463 may include an nFETs, pFETs, BJTs, or other suitable switching logic component(s).

The second high side switching circuit 464 may include a second switching element 465 and/or a third switching element 466. The second switching element 465 and the third switching element 466 may be configured to couple the second power input 422 to a filter input node 470. The second switching element 465 and/or third switching element 466 may include nFETs, pFETs, BJTs, or other suitable switching logic component(s).

The low side circuit 480 may be coupled to a reference node, such as ground at a reference input 426. The low side circuit 480 may receive the low side enable from the voltage controller 402, and may selectively provide the reference voltage to the filter 490 based on the low side enable. The low side circuit 480 may include an n-type metal oxide semiconductor field effect transistor (MOSFET), a p-type MOSFET, a bi-polar junction transistor (BJT), or other suitable switching logic component(s).

The filter 490 provides an output at a power output 492. In an embodiment, the filter 490 is a low-pass filter. The output of the filter 490 may provide power for use by, for example, devices, circuits, and/or other apparatuses using electrical power (not shown).

During operation, the voltage controller 402 provides an active HS ENABLE signal and an in active LS ENABLE signal during a first time period. The control circuit 410 receives the HS ENABLE signal at the first input of the first AND gate 408, the first input of the second AND gate 418, and an input of the RC circuit 404. During a first portion of the first time period, the first AND gate 408 provides an active HS CTRL1 signal and the second AND gate 418 provides an in active HS CTRL2 signal. The active HS CTRL1 signal may enable the first switching element 463 to couple the first power input 420 to the filter input node 470. The inactive HS CTRL2 signal may disable one or both of the second switching element 465 and the third switching element 466, and decouple the second power input 422 from the filter input node 470.

During the transition from the first portion of first time period to a second portion of the first time period, a rise time associated the RC circuit 404 may be met. Accordingly, during a second portion of the first time period, the first AND gate 408 provides the inactive HS CTRL1 signal based on a change in value of the inverted output (e.g., via the inverter 406) of the RC circuit 404) and the second AND gate 418 provides the active HS CTRL2 signal based on a change in value of the inverted output (e.g., via the inverter 407) of the first AND gate 408. The inactive HS CTRL1 control signal may disable the first switching element 463 and decouple the first power input 420 from the filter input node 470. The active HS CTRL2 signal may enable one or both of the second switching element 465 and the third switching element 466 to couple the second power input 422 to the filter input node 470.

During the second time period, the voltage controller 402 provides an inactive HS ENABLE signal and an active LS ENABLE signal. The inactive HS ENABLE signal causes both the HS CTRL1 signal and the HS CTRL2 signal to have inactive states. The inactive HS CTRL1 signal may disable the first switching element 463 to decouple the first power input 420 from the filter input node 470. The inactive HS CTRL2 signal may disable one or both of the second switching element 465 and the third switching element 466 to decouple the second power input 422 from the filter input node 470. The active LS ENABLE signal enables the low-side circuit 480 to couple the reference input 426 to the filter input node 470.

As explained above, the filter 490 may receive inputs from each of the high-side circuit 460 and the low-side circuit 480 over a time period, and provide an output VOUT at a power output 492 that represents an average of the received inputs over the time period. The filter 490 may provide the power output 492 as a power supply to one or more consumers.

Figure 5:
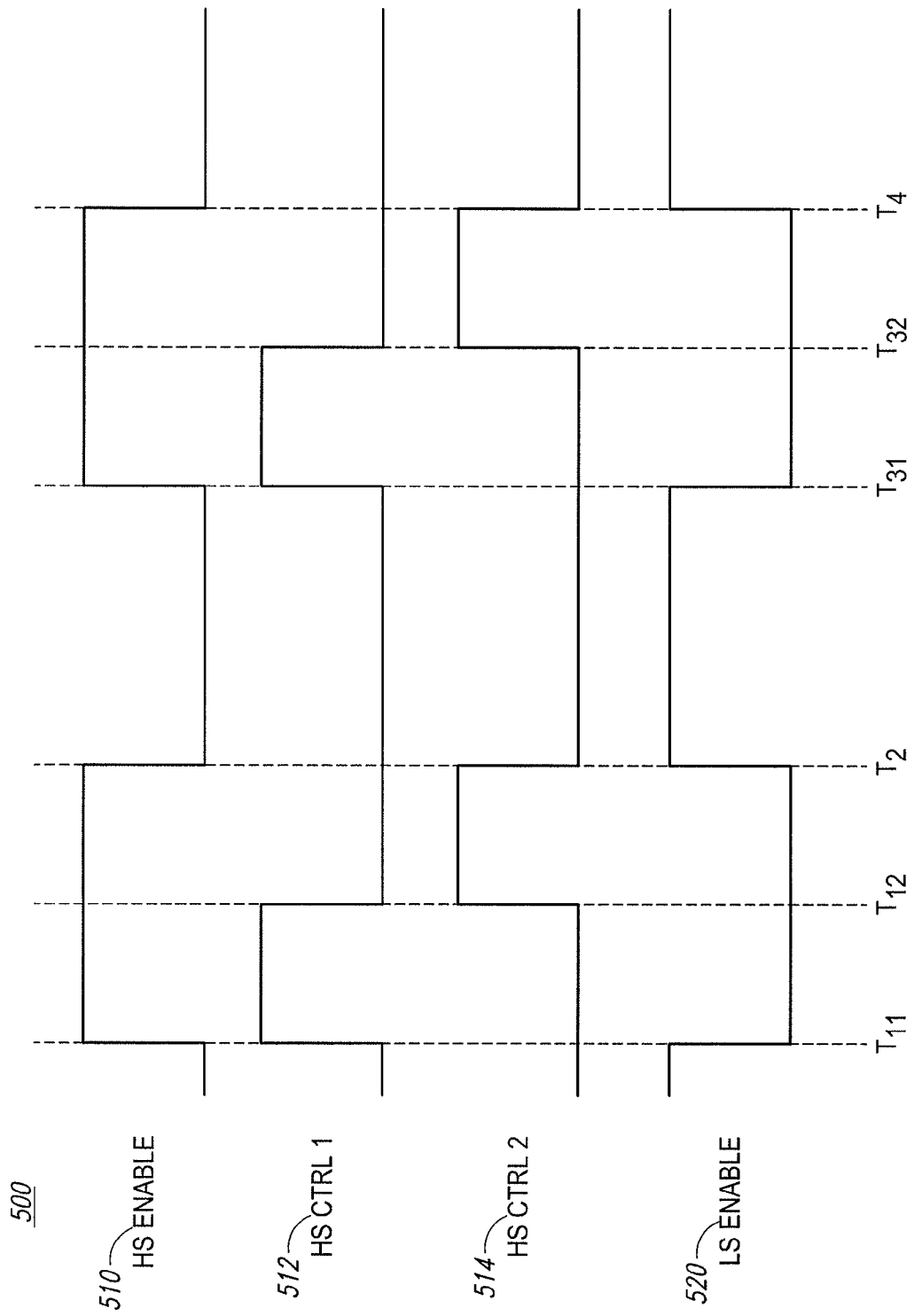
FIG. 5 is an exemplary timing diagram of a particular illustrative embodiment of a control circuit.

Referring to FIG. 5, an exemplary timing diagram of a particular illustrative embodiment of signals propagated through a voltage regulation circuit is disclosed and generally designated 500. For example, the exemplary timing diagram 500 may illustrate timing characteristics of the system 100 of FIG. 1, the system 200 of FIG. 2, the system 300 of FIG. 3, or the system 400 of FIG. 4. The timing diagram 500 depicts two voltage controller periods.

The two voltage controller periods include a first voltage controller period starting at a time T11 and ending at a time T31 and a second voltage controller period starting at the time T31. The timing diagram 500 depicts values of a high side enable signal HS ENABLE 510, a first high side control signal HS CTRL1 512, second high side control signal HS CTRL2 514, and a low side enable signal LS ENABLE 520 represented over time. The HS ENABLE signal 510 and the LS ENABLE signal 520 may be provided by a voltage controller, such as the voltage controller 302 of FIG. 3 or the voltage controller 402 of FIG. 4. The HS CTRL1 signal 512 and the HS CTRL2 signal 514 may be provided by a control circuit, for example, such as the control circuit 110 of FIG. 1, the control circuit 210 of control circuit FIG. 2, the control circuit 310 of FIG. 3, or the control circuit control circuit 410 of FIG. 4.

The timing diagram illustrates the complementary relationship between the HS ENABLE signal 510 and the LS ENABLE signal 520. For example, at the beginning of a first voltage controller time period starting at the time T11, the HS ENABLE signal 510 and the HS CTRL1 signal are activated by transitioning to a logical high value, and the LS ENABLE signal 520 is deactivated by transitioning to a logical low value. Further, at a time T2, the HS ENABLE signal 510 is deactivated by transitioning from the logical high value to the logical low value and the LS ENABLE signal 520 is activated by transitioning from the logical low value to the logical high value. The timing diagram also depicts the same complementary relationship between the HS ENABLE signal 510 and the LS ENABLE signal 520 during a second voltage controller period starting at time T31. That is, when the HS ENABLE signal 510 has a high value, the LS ENABLE signal 520 has a low value, and when the HS ENABLE signal 510 has a low value, the LS ENABLE signal 520 has a high value.

Each of the HS CTRL1 signal 512 and the HS CTRL2 signal 514 may be at least partially dependant on the HS ENABLE signal 510. For example, at time T11, when the HS ENABLE signal 510 transitions to a logical high value, the HS CTRL1 signal 512 transitions to a logical high value, and the HS CTRL2 signal 514 remains at a logical low value. Further, at a time T12, the HS CTRL1 signal 512 may transition to a logical low value, and the HS CTRL2 signal 514 may transition to a logical high value. At a time T2, when the HS ENABLE signal 510 transitions to the logical low value, the HS CTRL1 signal 512 remains at the logical low value and the HS CTRL2 signal 514 transitions to the logical low value.

The duration of time between T11 and T12 may be dependent upon a rise time associated with a delay circuit, such as the RC circuit 304 of FIG. 3 or the RC circuit of FIG. 4.

Similar to the time period between T11 and T2, at a time T31, the HS CTRL1 signal 512 transitions to the logic high value as the HS ENABLE signal 510 transitions to the logic high value, and at the time T32, the HS CTRL1 signal 512 transitions to the logic low value and the HS CTRL2 signal 514 transitions to the logic high value. At a time T4, the HS CTRL2 signal 514 transitions to the logic low value as the HS ENABLE signal 510 transitions to the logic low value. The timing diagram depicts the complementary relationship between the HS CTRL1 signal 512 and the HS CTRL2 signal 514 while the HS ENABLE signal 510 has a logic high value (e.g., between T11 and T2 and between T31 and T4). Thus, while the HS ENABLE signal 510 has a high value: when the HS CTRL1 signal 512 has a high value, the HS CTRL2 signal 514 has a low value, and when the HS CTRL1 signal 512 has a low value, the HS CTRL2 signal 514 has a high value.

The timing diagram 500 illustrates how a single HS ENABLE signal may be used to generate a voltage using two or more power sources. For example, a transition of the HS CTRL1 signal 512 from a logic low value to a logic high value may allow a high side switching circuit to couple a first voltage to a filter input node. Further, transition of the HS CTRL1 signal 512 from a logic high value to a logic low value may allow a high side switching circuit to decouple the first voltage from a filter input node. Similarly, a transition of the HS CTRL2 signal 514 from a logic low value to a logic high value may allow the high side switching circuit to couple a second voltage to a filter input node. Further, transition of the HS CTRL2 signal 514 from a logic high value to a logic low value may allow a high side switching circuit to decouple the second voltage from a filter input node. The transition of the LS ENABLE signal 520 between a logic low value and a logic high value may allow the low side switching circuit to decouple and couple, respectively, a reference supply from and to the filter input node.

Figure 6:
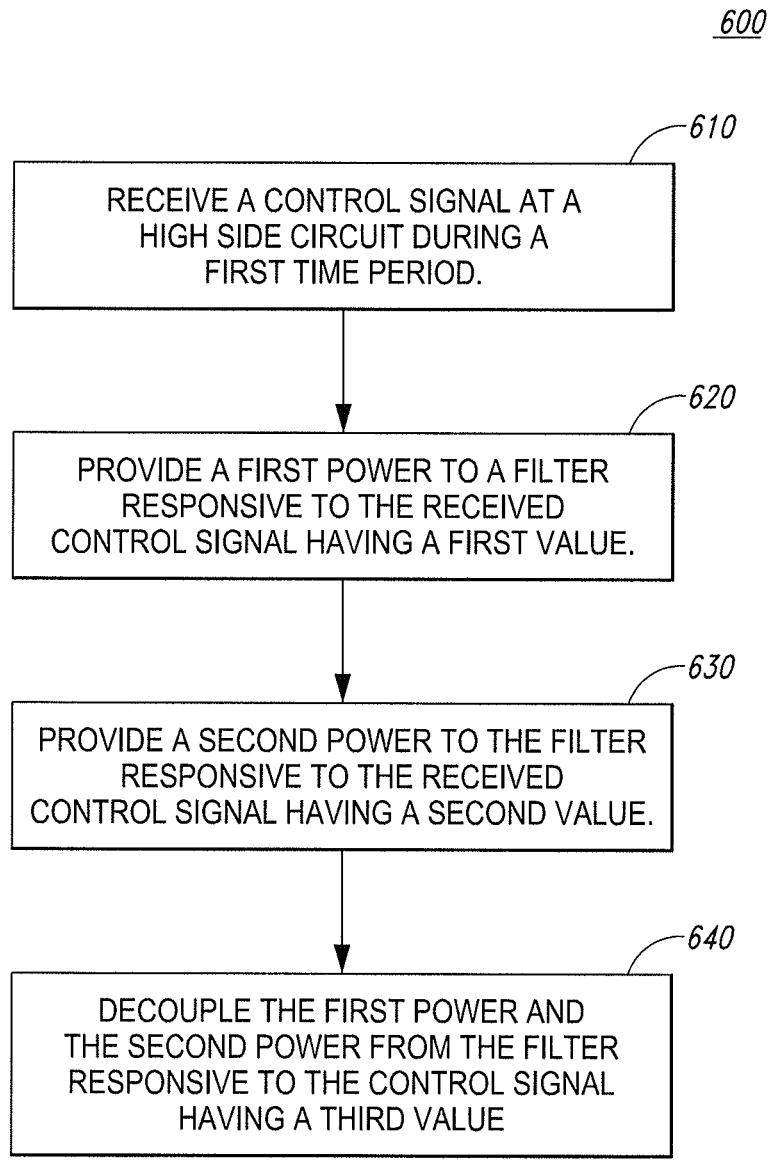
FIG. 6 is a flow chart of a particular illustrative embodiment of a method of regulating power in an apparatus.

Referring to FIG. 6, a flow chart of a particular illustrative embodiment of a method of regulating a voltage is disclosed and generally designated 600. The method 600 may be performed by the system 100 of FIG. 1, the system 200 of FIG. 2, the system 300 of FIG. 3, or the system 400 of FIG. 4.

The method 600 may include receiving a control signal at an output stage, wherein the control signal is provided by a control circuit, at 610. The control signal may be provided to the output stage by a control circuit. For example, the high-side circuit may include the high-side circuit 160 of FIG. 1, the high-side circuit 260 of FIG. 2, the high-side circuit 460 of FIG. 4, or any combination thereof. The control signal may be provided based on an enable signal received from a voltage controller. Receiving a control signal may include receiving a first control signal at a first switching element and a second control signal at a second switching circuit The method 600 may further include providing a first power to a filter in response to the received control signal having a first value, at 620. The filter may be the filter 190 of FIG. 1, the filter 290 of FIG. 2, the filter 490 of FIG. 4, or any combination thereof. The first power may be from a first power source. Providing the first power may include enabling the first switching circuit that is coupled to the first power source. The first switching circuit may be the first high side switching circuit 262 of FIG. 2, the first high side switching circuit 462 of FIG. 4, or any combination thereof. The first switching circuit may be enabled based on the control signal. The enabled first switching circuit may permit a first power source to be provided the filter. Enabling the first switching circuit may include activating a first switching element based on the first control signal having a first logical value.

The method 600 may further provide a second power to the filter in response to the received control signal having a second value, at 630. Providing the second power may include enabling the second switching circuit that is coupled to a second power source. The second switching circuit may be the second high side switching circuit 264 of FIG. 2, the second high side switching circuit 464 of FIG. 4, or any combination thereof. The second switching circuit may be enabled based on the control signal. The enabled second switching circuit may permit the second power source to be provided the filter. Enabling the second switching circuit comprises activating a second switching element based on the second control signal having the first logical active value. Enabling the second switching circuit may further include activating a third switching element based on the second control signal having the first logical value.

The method 600 further includes decoupling the first power and the second power from the filter responsive to the received control signal having a third value, at 640. The method may further include providing a third power to the filter based on an enable signal received from a voltage controller.

The method 600 may enable provision of a regulated output power based on input of two or more power supplies. The method 600 may reduce a load on a single power supply used to generate the regulated output power, and may provide a more robust regulated power supply.

The method 600 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 600 of FIG. 6 can be initiated by a processor that executes instructions by providing an enable signal to the control circuit.

Figure 7:
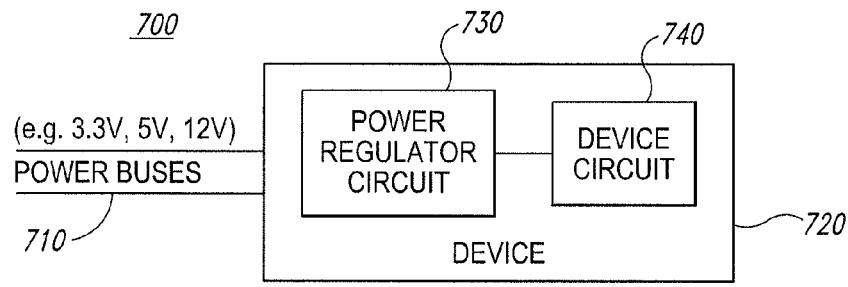
FIG. 7 is a block diagram of an apparatus including a power regulator circuit.

Referring to FIG. 7, a block diagram of a particular illustrative embodiment of an apparatus including a power regulator circuit is depicted and generally designated 700. The apparatus 700 includes an electronic device 720 coupled to a plurality of power buses 710. The electronic device may include a power regulator circuit 730 coupled to a device circuit 740.

The plurality of power buses 710 may provide one or more power supplies to the electronic device 720. For example, the plurality of power buses 710 may include a first power source and a second power source. In an embodiment, the plurality of power buses 710 may include a 3.3 volt power supply, a 5 volt power supple, a 12 volt power supply, or any combination thereof.

The power regulator circuit 730 may include the control circuit 110, the output stage 150, and/or the filter 190 of FIG. 1, the control circuit 210, the high-side circuit 260, the low-side circuit 280, and/or the filter 290 of FIG. 2, the voltage controller 304 and/or the control circuit 210 of FIG. 3, and/or the voltage controller 402, the control circuit 410, the high-side circuit 460, the low-side circuit 480, and/or the filter 490 of FIG. 4, or any combination thereof. The power regulator circuit may provide a power output to the device circuit 740. The power output may be a regulated power supply based on two or more of the plurality of power buses 710.

Figure 8:
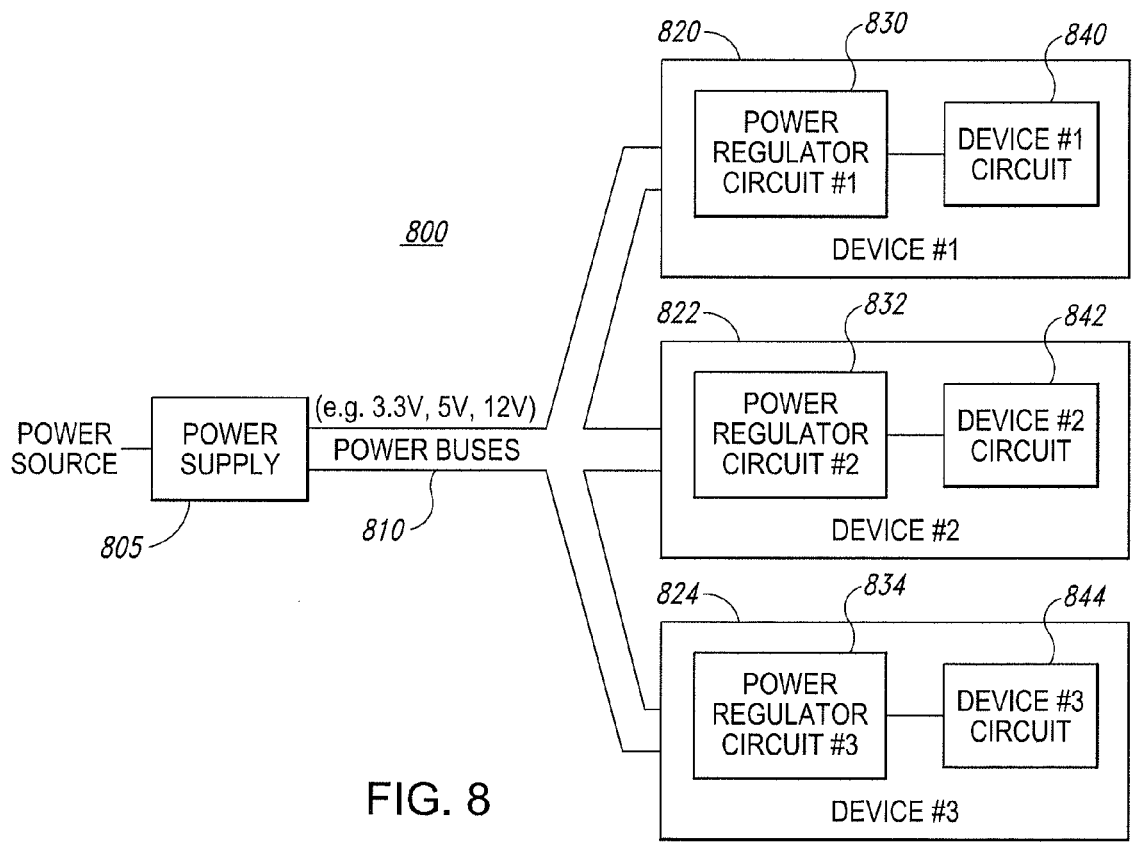
FIG. 8 is a diagram of a particular illustrative embodiment of system of a plurality of apparatuses including a power regulator circuit.

Referring to FIG. 8, a block diagram of a particular illustrative embodiment of a system of a plurality of apparatuses including a power regulator circuit is depicted and generally designated 800. The system 800 includes a power supply 805 that provides a plurality for power buses 810 coupled to each of a plurality of electronic devices, such as a first electronic device 820, a second electronic device 822, and a third electronic device 824. Each of the plurality of electronic devices may include a power regulator circuit (e.g., a first power regulator circuit 830, a second power regulator circuit 832, and/or a third power regulator circuit 834) coupled to a device circuit (e.g., a first functional circuit 840, a second device circuit 842, and/or a third device circuit 844). Each of the first electronic device 820, the second electronic device 822, and the third electronic device 824 may include the electronic device 720 of FIG. 7.

A power supply 805 may receive power from an external power source, and provide the plurality of power busses for use by the plurality of electronic devices. The plurality of power buses 810 may provide one or more power supplies to each of the plurality of the electronic devices. For example, the plurality of power buses 810 may include a first power source and a second power source. In an embodiment, the plurality of power buses 810 may conform to an advanced technology extended (ATX) power supply configuration. For example, the plurality of power buses 810 may include a 3.3 volt power supply, a 5 volt power supply, a 12 volt power supply, or any combination thereof. In other embodiments, the plurality of power buses 810 may include additional or different power supply voltages.

Each of the power regulator circuits (e.g., the first power regulator circuit 830, the second power regulator circuit 832, and/or the third power regulator circuit 834) may receive one or more of the plurality of power buses 810. Each power regulator circuit may include the control circuit 110, the output stage 150, and/or the filter 190 of FIG. 1, the control circuit 210, the high-side circuit 260, the low-side circuit 280, and/or the filter 290 of FIG. 2, the voltage controller 304 and/or the control circuit 210 of FIG. 3, and/or the voltage controller 402, the control circuit 410, the high-side circuit 460, the low-side circuit 480, and/or the filter 490 of FIG. 4, the power regulator circuit 730, or any combination thereof. Each power regulator circuit may provide a power output to a respective device circuit (e.g., the first functional circuit 840, the second device circuit 842, and/or the third device circuit 844). The power output may be a regulated power supply based on two or more of the plurality of power buses 810.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a control circuit configured to receive an enable signal and provide a control signal, a value of the control signal based on the enable signal;
a high side circuit configured to receive first power at a first input and second power at a second input, the high side circuit further configured to selectively provide one of the first or the second power to a node based on the value of the control signal,
wherein the high side circuit comprises:
a first high side switching circuit having a first switching element, the first high side switching circuit configured to provide the first power to the node responsive to the control signal having a first value; and
a second high side switching circuit having a second switching element and a third switching element coupled in series to the second switching element, the second high side switching circuit configured to provide the second power to the node responsive to the control signal having a second value;
a low side circuit configured to selectively provide a reference to the node responsive to the enable signal; and
a filter coupled to the node and configured to provide output power responsive to input received at the node.

2. The apparatus of claim 1, wherein the first switching element and the second switching element each comprises an n-channel transistor, a p-channel transistor, a bi-polar junction transistor, or combinations thereof.

3. The apparatus of claim 1, wherein the third switching element includes at least one of an n-channel transistor, a p-channel transistor, or a bi-polar junction transistor.

4. The apparatus of claim 1, wherein the control signal comprises a first high side control signal provided to the first high side switching circuit and a second high side control signal provided to the second high side switching circuit.

5. The apparatus of claim 1, wherein the control circuit comprises a first AND gate and a second AND gate, wherein a resistor-capacitor (RC) circuit is coupled to an input of the first AND gate.

6. The apparatus of claim 5, wherein a rise time associated with the RC circuit is less than a time period corresponding to the enable signal being active.

7. The apparatus of claim 1, wherein the first power is provided by a first power source, the second power is provided by a second power source that is distinct from the first power source, and the reference is provided via a reference node.

8. The apparatus of claim 1, wherein the enable signal comprises a high side enable signal and a low side enable signal, wherein the control circuit is configured to provide the control signal based on the high side enable signal and wherein the low side circuit is configured to selectively provide the reference to the node based on the low side enable signal.

9. The apparatus of claim 8, wherein the control circuit is configured to provide the control signal having a first or second value while the high side enable signal is active, and is configured to provide the control signal having a third value while the high side enable signal is inactive.

10. The apparatus of claim 1, wherein the high side circuit being configured to selectively provide the first and/or second power comprises the high side circuit being configured to selectively provide a combination of the first and second power based on the control signal.

11. The apparatus of claim 1, wherein the high side circuit is configured to decouple the first and second power from the node based on the control signal, and wherein the low side circuit is configured to decouple the reference from the node based on the enable signal.

12. The apparatus of claim 1, wherein the output power comprises an average of the first power, second power and/or reference received on the node over a period of time.

13. The apparatus of claim 1, wherein the high side circuit is further configured to receive third power at a third input, and wherein the high side circuit being configured to selectively provide the first and/or second power to the node comprises the high side circuit being configured to selectively provide the first, second and/or third power to the node based on the control signal.

14. The apparatus of claim 1, wherein the first power comprises a first voltage, the second power comprises a second voltage, and the reference comprises a reference voltage.

15. An apparatus comprising:
a power regulator circuit comprising:
a control circuit configured to receive an enable signal and provide a control signal based on the enable signal;
a high side switching circuit configured to receive first power at a first input and second power at a second input, the high side switching circuit further configured to selectively enable, based on the control signal, a first switching element to provide the first power to a node or a second switching element and a third switching element coupled in series to the second switching element to provide the second power to the node;
a low side switching circuit configured to selectively provide a reference to the node responsive to the enable signal;
a filter coupled to the node and configured to provide output power based on input received at the node; and
a device circuit coupled to the power regulator circuit and configured to receive the output power.

16. The apparatus of claim 15, wherein the filter includes a low pass filter.

17. The apparatus of claim 16, wherein the output of the filter is a power supply to the device circuit.

18. The apparatus of claim 15, further comprising a voltage controller configured to provide the enable signal.

19. The apparatus of claim 15, wherein the enable signal has a first value during a first time period and a second value during a second time period that is distinct from the first time period.

20. The apparatus of claim 19, wherein the control signal has a first value during a first portion of the first time period and a second value during a second portion of the first time period, wherein the first portion and the second portion are distinct.

21. An apparatus comprising:
a high-side circuit comprising:
a high side control input configured to receive a control signal from a control circuit, wherein the control signal is generated based on a first enable signal provided by a voltage controller;
a plurality of power source inputs, each of the plurality of power source inputs coupled to a respective power source;
an output coupled to a filter input node, the output configured to provide at least one of the plurality of power sources to the filter input node based on a value of the control signal; and
a first switching element and a second switching element coupled in series to the first switching element, wherein the first and second switching elements are configured to provide one of the power sources to the output based on the control signal; and a low-side circuit comprising:

a low side control input coupled to the voltage controller and configured to receive a second enable signal from the voltage controller, a low side input coupled to a ground terminal responsive to the second enable signal; and an output coupled to the filter input node.

22. A method comprising:

receiving a control signal at an output stage, wherein the control signal is provided by a control circuit based on an enable signal, wherein the output stage comprises a first switching circuit having a first switching element and a second switching circuit having a second and third switching element, wherein the second and third switching elements are coupled in series;

providing a first power to a filter responsive to the received control signal having a first value;

providing a second power to the filter responsive to the received control signal having a second value;

decoupling the first power and the second power from the filter responsive to the received control signal having a third value; and providing a third power to the filter responsive to the enable signal received from a voltage controller.

23. The method of claim 22, wherein providing the first power comprises enabling the first switching circuit that is coupled to a first power source, and wherein providing the second power comprises enabling the second switching circuit that is coupled to a second power source.

24. The method of claim 23, wherein receiving the control signal comprises receiving a first control signal at the first switching circuit and a second control signal at the second switching circuit.

* * * * *